UNITED STATES PATENT OFFICE.

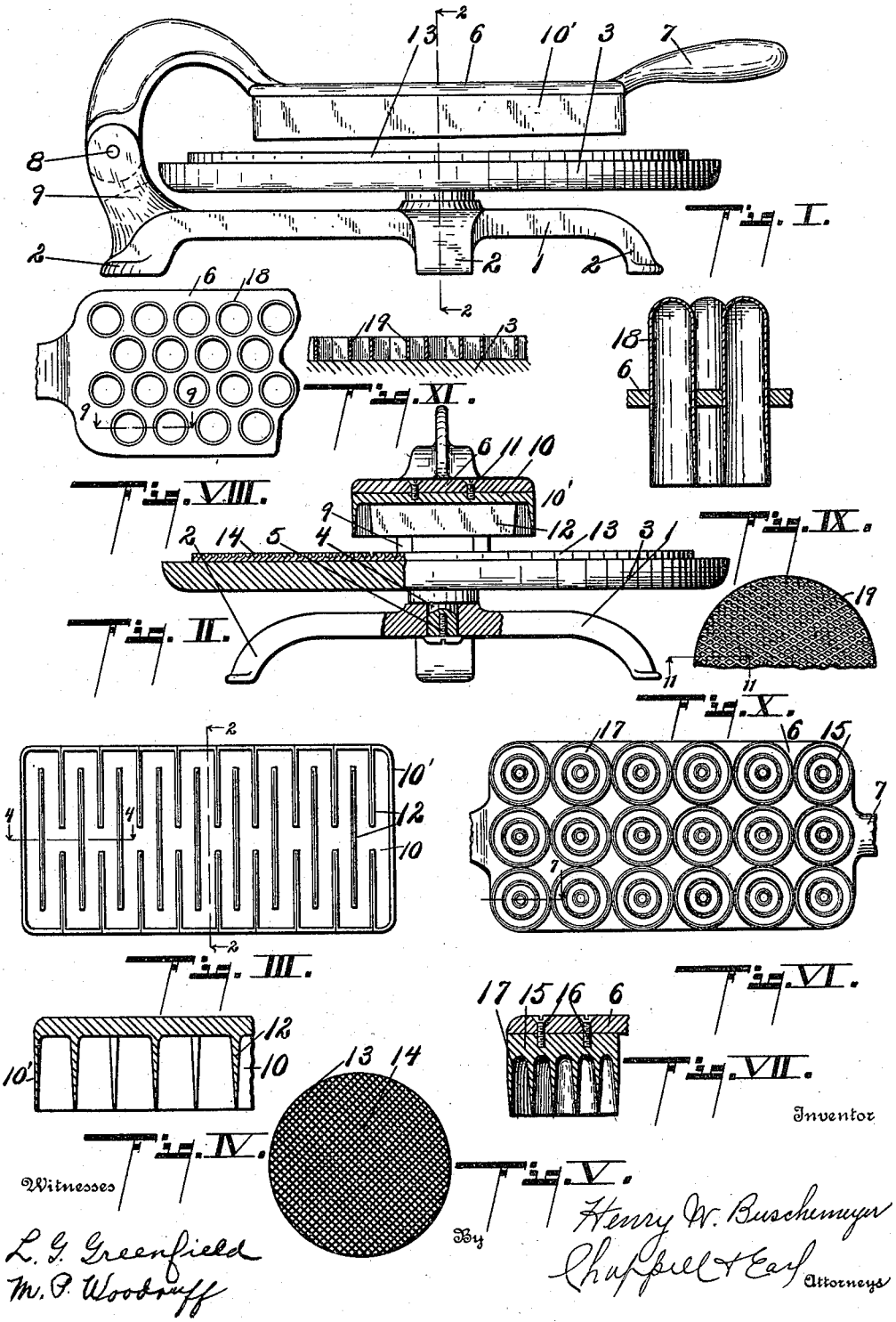

HENRY W. BUSCHEMEYER, OF LOUISVILLE, KENTUCKY, ASSIGNOR TO VIRGINIA LEE BUSCHEMEYER, OF LOUISVILLE, KENTUCKY.

DOUGH MIXER AND PROCESS.

1,147,924.   Specification of Letters Patent.   Patented July 27, 1915.

Application filed December 13, 1910, Serial No. 597,039. Renewed January 8, 1915. Serial No. 1,240.

*To all whom it may concern:*

Be it known that I, HENRY W. BUSCHEMEYER, a citizen of the United States, residing at Louisville, Jefferson county, Kentucky, have invented certain new and useful Improvements in Dough Mixers and Processes, of which the following is a specification.

This invention relates to an improved dough mixer and dough mixing process.

The objects of the invention are to provide an improved dough mixer and method whereby aeration of the dough is secured without unnecessarily crushing the same.

Objects pertaining to details of the device will definitely appear from the description to follow.

I accomplish the objects of my invention by the devices and means described in the following specification.

The invention is clearly defined and pointed out in the claims.

Preferred embodiments of the apparatus or mixer, by means of which I carry out my improved method or process, are clearly illustrated in the accompanying drawing, forming a part of this specification, in which:—

Figure I is a detail elevation view of my improved mixer. Fig. II is a detail elevation view, partially in section, on a line corresponding to line 2—2 of Figs. I and III. Fig. III is an inverted plan view of the mixer head. Fig. IV is an enlarged detail sectional view on line corresponding to line 4—4 of Fig. III. Fig. V is a reduced plan view of the dough board or plate removed from the mixer. Fig. VI is a detail view of a modified form of the mixer head. Fig. VII is an enlarged detail sectional view on line corresponding to line 7—7 of Fig. VI, showing the separate sections of that head. Fig. VIII is an inverted plan view of another modified form of mixer head. Fig. IX is an enlarged sectional view on line 9—9 of Fig. VIII, showing the details of that construction. Fig. X is a plan view of a modified form of the dough-board or plate. Fig. XI is a sectional view, taken on a line corresponding to line 11—11 of Fig. X.

In the drawings, similar numerals of reference refer to similar parts throughout the several views, and the sectional views are taken looking in the direction of the little arrows at the ends of the section lines.

Considering the numerals of reference, 1 is the base supported by suitable legs 2, which carries the remaining structure, consisting of a turn-table 3, which is journaled at 4 and retained in place by a cap-screw 5. A lever 7, expanded into a head 6, is fulcrumed at 8 on a suitable arm 9 on the base 1. Secured to the under side of the head 6 is the mixer face 10, which is inclosed by a rim 10′ and is provided with cross ribs 12, something like baffle plates, the entire area of the under side of the mixer head being open and in communication, the air in the same being confined during the downward motion of the head by the rim 10′. This mixer face is secured to the under side of the head 6 by screws 11 which are tapped into the same.

On the turn-table 3, I support a dough-board or plate 13, which is corrugated or checked on its upper surface to form an uneven surface 14 for the support of the dough—see Fig. V.

In operation, flour and water and any other ingredients constituting the dough are placed upon the dough-plate or board 13, and the same is acted upon by operating the lever up and down and rotating the turn-table. At each downward stroke, the air is forced into the dough and the whole surface is acted upon, and at each upstroke a vacuum effect is secured that tends by it effect to agitate and knead the entire mass of dough, without any injurious grinding or crushing action. By rotating the turn-table during the reciprocation or operation of the lever, it is clear that every part of the dough will be acted on by the mixer face, and the whole will become thoroughly agitated and aerated without injurious pressing or rolling action upon any part of the same. At the same time, air will be effectively forced into and will permeate the entire mass of the dough. When the batch of dough is acted upon and spread out into a comparatively thin layer, the lever 7 is lifted up and the layer of dough folded on itself, thus inclosing a quantity of air, owing to the irregular upper surface, and the operation of the lever is then repeated. This incases the air, causing it to thoroughly permeate the entire mass. In the mixing process, to avoid the constant sprinkling with flour, the dough-board has a checked or corrugated upper surface, so that very little flour is added to the mass of the dough to keep the same from sticking, so that there is substantially no fresh flour brought into the mass after the mixing operation is once in progress. The dough is mixed stiff. The operation of the mixer thoroughly develops the gluten that is in the flour and causes it to permeate fully the entire dough mass and incase and confine the admixed air. When the dough thus mixed is molded and passed to the oven, the air, being thus completely and effectively confined in the gluten mass, expands and a proper expansion of the dough is secured. A light bread or biscuit is thus formed. The extent of the expansion depends on the speed of the oven. Expansion is most complete with a slow oven. It is thus seen that it is very important not to injuriously crush or divide the dough, but to force air into the same and to corrugate deeply the surface, so that, as the operation proceeds and the air is compressed into the dough, it is thoroughly infolded and incased by the gluten. The gluten is, in a measure, expanded by the water and thus permeated into the dough, so that it completely engages and encompasses the air that has been finely divided and forced into the dough. The folding operation greatly enhances this action, and the gluten, by the process, is developed much as wheat gum is developed by the chewing process. This gluten, permeating the mass, has the effect of confining the air and secures the lightening quality thereof, much as the use of beaten eggs secures the lightening action when eggs are added to dough in the usual mixing operation.

In Figs. III and IV, I have shown the preferred form of mixer head, which operates very effectively and very rapidly upon the dough. Another form, which is very effective, is seen in Figs. VI and VII in which the kneader parts 15 are separate circular sections secured to the head 6 by screws 16. These sections are of a very convenient form to manufacture, as the parts or patterns therefor can be readily turned upon a lathe, consisting of concentric cups 17, and are very effectively supported. This structure appearing in Figs. VI and VII is exceedingly effective in its action, but the structure is rather more expensive to produce. In Figs. VIII and IX, I also show details of a still further modification, in which a much larger volume of air is confined and an exceedingly effective structure is produced. This, however, is far more expensive than the structures illustrated in Figs. VI and VII. A series of inverted closed tubes 18 are disposed through the head 6, as shown.

In Fig. V, I show a dough-board or plate in the form most practical. A modification appears in Figs. X and XI, in which the dough-board is completely perforated so that narrow ridges 19 support the dough, and, by this means, a still less quantity of flour is required to keep the dough from sticking. It is, however, a more expensive structure to produce, and slightly more difficult to keep in order, and I find the structure of Fig. V does not introduce enough fresh flour at each manipulation to be especially objectionable, although the structure appearing in Figs. X and XI is more effective.

The term "aerated" as I use it should be construed literally. I am aware that, where carbonic acid gas is forced into dough and then baked that the bread is denominated as "aerated." The effect of carbonic acid is highly objectionable and my invention does not contemplate its use. It should be excluded.

I have explained that my invention is capable of modification.

Having thus described my invention, what I claim as new and desire to secure by Letters Patent is:

1. In a dough mixer, the combination of a suitable base; a turn-table; a corrugated dough-board for the said turn-table; a lever with a mixing head; a face for the said head provided with a deeply ribbed surface, and an encircling rim for confining the air, when said face is forced against the dough, coacting substantially as described and for the purpose specified.

2. In a dough mixer, the combination of a suitable base; a turn-table; a lever with a mixing head; a face for the said head provided with a deeply ribbed surface, and an encircling rim for confining the air, when said face is forced against the dough, coacting substantially as described and for the purpose specified.

3. In a dough mixer, the combination of a suitable dough-board; and a mixing head with a deeply ribbed face for corrugating the dough, the same being provided with an encircling rim for confining the air when the head is pressed against the dough, coacting for the purpose specified.

In witness whereof, I have hereunto set my hand and seal in the presence of two witnesses.

HENRY W. BUSCHEMEYER. [L. S.]

Witnesses:
CLORA ELLYN BRADEN,
MARGARET L. GLASGOW.

Copies of this patent may be obtained for five cents each, by addressing the "Commissioner of Patents. Washington, D. C."